United States Patent [19]

Obra

[11] Patent Number: 4,805,284

[45] Date of Patent: Feb. 21, 1989

[54] MOTION GENERATING MECHANISM WITH BACKLASH REGULATION

[75] Inventor: Bart R. Obra, Warren, Mich.

[73] Assignee: Easom Engineering & Manufacturing Corporation, Mt. Clemens, Mich.

[21] Appl. No.: 188,175

[22] Filed: Apr. 25, 1988

Related U.S. Application Data

[63] Continuation of Ser. No. 938,806, Dec. 8, 1986, abandoned.

[51] Int. Cl.[4] .................................... B23Q 17/00
[52] U.S. Cl. .................................... 29/406; 29/159.2
[58] Field of Search ................ 74/393, 394, 409, 434, 74/439, 446, 447; 29/159.2, 406

[56] References Cited

U.S. PATENT DOCUMENTS

| | | | |
|---|---|---|---|
| 533,394 | 1/1895 | Mosher | 464/38 |
| 1,549,845 | 8/1925 | Münz | 474/112 |
| 1,687,987 | 10/1928 | Moon | 74/446 |
| 2,549,241 | 4/1951 | Rorive | 74/397 |
| 2,784,612 | 3/1957 | Liska | 74/393 |
| 3,379,034 | 4/1968 | Gustafson | 464/38 |
| 3,439,553 | 4/1969 | Curlett | 74/409 |
| 3,507,162 | 4/1970 | Nomura et al. | 74/394 |
| 3,546,897 | 12/1970 | Kenny | 464/38 |
| 4,020,708 | 5/1977 | Obra | 74/52 |
| 4,084,756 | 4/1978 | Coxhill | 74/409 |
| 4,089,228 | 5/1978 | Obra | 74/52 |
| 4,269,076 | 5/1981 | Obra | 74/52 |
| 4,331,040 | 5/1982 | Swasey | 74/409 |
| 4,338,853 | 7/1982 | Neumeyer | 74/409 |
| 4,569,240 | 2/1986 | Obra | 74/394 |
| 4,586,393 | 5/1986 | Mooney et al. | 74/409 |

FOREIGN PATENT DOCUMENTS 1129029 2/1955 Fed. Rep. of Germany ........ 74/394

Primary Examiner—Leslie A. Braun
Assistant Examiner—Scott Anchell
Attorney, Agent, or Firm—Basile and Hanlon

[57] ABSTRACT

A relatively large diameter gear in a cyclic motion generating mechanism is finished and assembled into the mechanism in a manner such that, although the gear may not be precisely truly circular, binding or interference with a meshed gear is eliminated while zero backlash exists at the cycle end position of the gear. After the teeth are formed on the gear blank, a series of diametral measurements to locate one position at which the maximum diameter intersects the pitch circle. A radius from this point of intersection larger than the designed radius of the pitch circle is then employed to locate a center of the blank about which the central opening is subsequently machined to establish the rotational axis of the finished gear. This axis is so located that when the gear is assembled into the mechanism in mesh with the input gear of the gear box, zero backlash will exist between these two gears when the point from which the center radius was determined is in mesh, and the radial distance from the center of rotation of the gear to its pitch circle at this point is greater than a radius to any other point on the pitch circle.

6 Claims, 2 Drawing Sheets

MOTION GENERATING MECHANISM WITH BACKLASH REGULATION

This application is a continuation of application Ser. No. 06/938,806, filed 12/8/86 abandoned.

BACKGROUND OF THE INVENTION

In my prior U.S. Pat. Nos. 4,020,708; 4,089,228 and 4,569,240, there are disclosed various forms of motion generating mechanisms in which a constant rotary speed input from a prime mover is transformed into a cyclic output in which, during each cycle, a rotary output member is accelerated during the first portion of the cycle and decelerated through the final portion of the cycle. The rotary output member may, for example, be a gear which is meshed with a rack to drive the rack in a linear stroke cycle from a start to a finish position in motion such that a plot of the linear velocity of the rack versus its distance from its start position would resemble a cycloidal curve.

In the mechanism disclosed in my U.S. Pat. No. 4,569,240, a rotary input shaft drives a planet gear in rotation about a sun gear which is fixed. The planet gear carries a crank pin offset from its axis of rotation which is received within a radial slot in a relatively large diameter gear mounted for rotation about an axis coaxial with that of the fixed sun gear. This relatively large gear is in turn meshed with the input gear of a motion multiplying gear box whose output in turn is coupled to a rack or other driven member. In this arrangement, the planetary gear-crank mechanism transforms the constant speed rotary input into a cyclically variable speed rotation of the relatively large diameter gear assembly. The system is so designed that the relatively large gear assembly will rotate through one complete revolution for each working cycle or stroke of the driven output member. The multiplying gear box driven by the relatively large diameter gear assembly converts this single revolution of the relatively large gear assembly into the necessary number of revolutions to drive the output member the distance required to perform its intended work function.

In many applications, it is essential that the output member driven by the motion generating mechanism be located precisely at the same fixed reference point at the end of each working cycle. The precision with which this may be accomplished is largely dependent upon the amount of backlash which exists between the relatively large diameter gear assembly and the meshed input gear of the multiplying gear box. Any backlash which exists between these two gears is multiplied by the gear box.

The relatively large diameter gear assembly, for reasons described below, is manufactured with a relatively large central opening. In a typical application, this gear may have a pitch circle diameter of 16 inches. Because of its configuration, its size, and hardening processes, it is extremely difficult to manufacture this particular gear to precise tolerances. Typically, measurements of the finished gear will reveal that its pitch circle is not precisely circular. Experience has shown that this deviation is unpredictable and in most cases, for all practical purposes, uncorrectible. This has resulted in an unacceptably high scrap rate. Any substantial deviation from true circularity is directly reflected in the backlash characteristics of such a gear. The deviation from true circularity may be such that when meshed with another gear, backlash may be unacceptably high (loose) when one point of the gear is in mesh with the mating gear and may be negative—that is binding—at another point.

The present invention is directed to minimizing the effect of the problem described above in the assembled motion generating mechanism.

SUMMARY OF THE INVENTION

As noted above, accurate regulation of the backlash in a motion generating mechanism of the type described above is normally of primary concern from the standpoint of accurately regulating the position of the member driven by the mechanism at the end of the stroke or working cycle of the driven member. Because the relatively large gear in question is moved through one complete revolution for each working cycle of the driven member, to assure that the driven member is located at the precise same position at the end of a working cycle, the backlash between the relatively large gear and the multiplying gear with which it is meshed must be zero at the end of the cycle. Comparable precision of positioning the driven members at specific stages within its working cycle is normally not required.

In accordance with the present invention, zero backlash in a mechanism of the type described above where the relatively large gear may not be truly circular is achieved in the following manner.

The gear, after the final tooth formation, is measured to determine the angular position about the gear axis at which the diameter of the gear (or more correctly its pitch circle) is a maximum. The gear is then marked at one point to indicate the space between two teeth which are on opposite sides of a line representing the maximum diameter position. If measurements find the gear is in fact truly and precisely circular, the mark is placed between two teeth selected most favorably for the ultimate assembly process.

The central opening in the gear is then precision ground about a center lying at a radial distance from a measuring pin seated between the two teeth adjacent the mark which exceeds the design pitch circle radius is measured from the pin. The radius from this center, which is the finished axis of rotation of the gear, to the pitch circle at the point at which the measurement was taken will thus exceed the radius from the axis of rotation of the gear as finished to any other point on its pitch circle. If the gear were in fact truly circular, its central opening, by the foregoing procedure, would be formed to establish the axis of rotation of the gear as assembled in the mechanism slightly eccentric to the pitch circle.

The gear is then assembled into the motion generating mechanism at a rotative orientation such that at the end of the working cycle, the point at which the gear is in mesh with its mating gear is the space marked as described above. The meshed gear is so mounted in the mechanism that zero backlash will be present at this point. Because all other points on the circumference of the relatively large gear lie at radial distances from its axis less than that of the cycle end mesh point, no binding will occur during rotation of the gear, although backlash in variable amounts will be present at all points other than the cycle end position of the gear.

Other objects and features of the invention will become apparent by reference to the following specification and to the drawings.

IN THE DRAWINGS

The motion generating mechanism shown in FIG. 1 of the drawings is, with the exception of an improvement to be described in greater detail below, the motion generating mechanism disclosed in my U.S. Pat. No. 4,569,240, the disclosure of which is hereby incorporated by reference.

Figure 1:
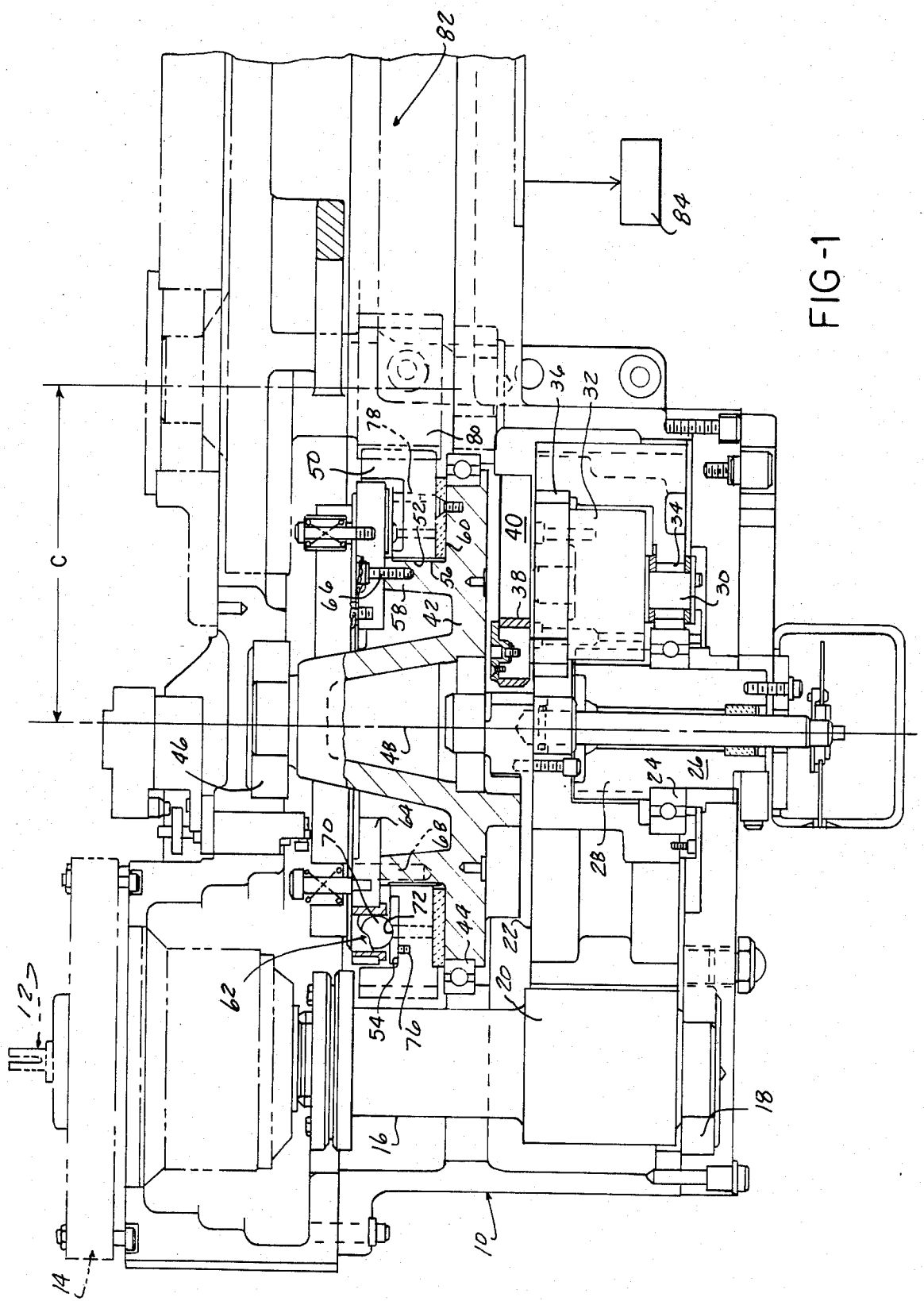
FIG. 1 is a cross-sectional view of a motion generating mechanism embodying the present invention.

The mechanism shown in FIG. 1 includes a housing designated generally 10 from which projects a rotatable input shaft 12 which drives, through a gear reducer designated generally 14 a first shaft 16 rotatably journalled within the housing as by a bearing 18. Shaft 16 fixedly carries a first gear 20 which is meshed with a second gear 22 mounted by a bearing 24 for rotation relative to the housing coaxially upon the shaft 26 of a sun gear 28. Sun gear 28 and its shaft 26 are fixedly mounted in housing 10 by means described more fully in my U.S. Pat. No. 4,569,240.

Gear 22 rotatably receives the shaft 30 of a planet gear 32 in a bearing 34 carried by gear 22. Sun gear 28 and planet gear 32 in the embodiments shown have a 1:1 gear ratio, thus one complete revolution of planet gear 32 around sun gear 28 will drive planet gear 32 in one complete revolution about the axis of its shaft 30. Although only one planet gear 32 is shown in the drawing, the mechanism may include a plurality of planet gears 36 rotatively mounted on gear 22 at uniformly spaced positions about the axis of gear 22.

A planetary crank arm 36 is fixedly mounted upon planet gear 32 and rotatably supports an annular shoe 38 slightly above the upper surface of crank 36. Shoe 38 is received within a radial slot, one wall of which is indicated at 40, formed on the underside of a rotatable member 42 supported for rotation in housing 10 as by bearings 44, 46 about an axis 48 coaxial with the axis of fixed sun gear 28. A main gear 50 having a relatively large central opening 52 and an accurately flat side surface 54 is seated upon rotatable member 42. Central opening 52 of main gear 50 is engaged with an annular plain bearing 56 mounted on the outer side of an upwardly projecting annulus 58 integrally formed on member 42. Side surface 54 of main gear 50 is engaged with the surface of an annular plate 60 fixedly secured to member 42 to function as a thrust bearing.

Gear 50 is rotatively coupled to rotary member 42 by means of a plurality of spring loaded ball detents designated generally 62, only one of which is shown in FIG. 1. Detents 62 are carried by a plate 64 fixedly secured to member 42 as by bolts 66 and accurately rotatively oriented relative to member 42 as by a plurality of dowel pins 68. The balls 70 of detents 62 are seated in conical recesses 72 formed in a detent plate insert 74 fixedly mounted upon gear 50 as by bolts 76 and accurately rotatively oriented relative to gear 50 as by dowel pins 78. The detent arrangement just described acts as an overload coupling which normally rotatively couples gear 50 to rotatable member 42, but which will release in the event of an overload.

Gear 50, which is of relatively large diameter, is meshed with a relatively small diameter gear 80 which is the input gear of a multiplying gear box designated generally 82 which will transmit and multiply rotation of gear 50 to a schematically indicated driven device 84.

The mechanism described thus far may be said to include a motion modifying mechanism represented by the planetary gearing system constituted by fixed sun gear 28, planet gear 32 and the planetary crank 36, 38, and a motion multiplying mechanism represented by the gear box 82.

The motion modifying portion of the mechanism—the planetary gear train and crank—transform a constant speed rotary input applied to gears 20 and 22 into a variable speed rotary output to rotary member 42 in which, in the embodiment shown, the rotary speed of member 42 starts from zero at a start position, continuously accelerates through the first 180 degrees of a revolution and then continuously decelerates through the final 180 degrees of a revolution to return to zero as member 42 returns to its original start position. Assuming a constant rotary speed of gear 22, a plot of the rotary speed of member 42 versus displacement from its start position would be in the form of a cycloidal curve.

This modified motion is transmitted from gear 50 to the input gear 80 of the multiplying gear box which will multiply the rotary movement of gear 50 by a factor sufficient to drive the output device 84 through a linear stroke or rotary displacement of a length or number of rotations required for a single operational cycle for each revolution of gear 50. Typically, this will require that gear box 82 will multiply the rotary movement of gear 50 by 10 or 12 times or more.

Where it is required that the working stroke of output device 84 terminate at precisely the same location at the end of each successive stroke, any backlash which exists between gears 50 and 80 will be multiplied by the gear box ratio so that any positional error between gear 50 and gear 80 at the end of a working cycle will be multiplied by the gear box ratio at the working device 84.

Figure 2:
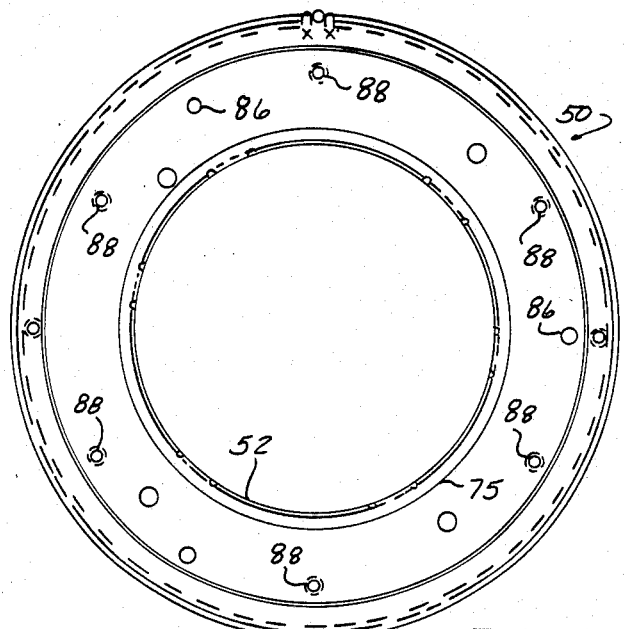
FIG. 2 is a top plan view of a main gear of the mechanism of FIG. 1.

From the drawings, it will be observed that gear 50 is of relatively large diameter and is formed, as best seen in FIG. 2, with a relatively large diameter central opening 52. A typical set of dimensions for gear 50 might be a pitch circle diameter of 16 inches with a central opening diameter somewhere between 9 and ½ and 9 and ¾ inches.

It is extremely difficult to produce a gear 50 of the configuration and dimensions referred to above to exact tolerances. Despite the exercise of extreme care throughout the production process, at the conclusion of the tooth forming procedure, overpin measurements taken across different rotating positions of the gear will usually show that the pitch circle of the gear is not precisely circular. In such a situation, the backlash between the gear under consideration and a meshed gear will vary around the circumference of the gear under consideration. Depending upon the magnitude of this deviation, binding—that is negative backlash—might exist at certain rotary positions of the gear while an undesirable amount of backlash would be present at other rotary positions.

In accordance with the present invention, the possibility of binding between gear 50 and its meshed gear 80 is eliminated, and zero backlash at the dwell point of the cycle—that is the start or finish point—is achieved in the following manner.

Referring now particularly to FIG. 2, gear 50 is formed, with the exception of two dimensions, to its finally finished state. The two excepted dimensions are those of the diameter of central opening 52 and the diameter of the detent receiving neck surface 75. In both cases, extra stock to accommodate subsequent grinding is left at these two surfaces.

Measurements over pins are then taken across a sufficient number of positions around the gear to locate the high point or position of maximum diameter. As is well known, overpin measurements are taken by resting two pins of a known diameter between two teeth at diametrically opposite sides of the gear and measuring the distance across the pins. When the high point or maximum diameter position is determined by this technique, the gear is marked to indicate the two teeth engaged by one of the pins at this position.

In the quite unlikely event the overpin measurements establish that the gear has no high point—that is its pitch circle is precisely circular, any two adjacent teeth may be marked.

The gear is then set up in a grinder to finish grind surfaces 52 and 75 to the finished diameter. The center about which the gear is set up on the grinder is located by placing a pin between the two teeth marked as described above and locating the center at a radial distance from the pin such that the radial distance from the center to the pitch circle of the gear midway between the two teeth engaged with the pin is equal to (D+X/2) where D is the designed pitch circle diameter of the gear and X is a linear distance such that the radial distance from the center to the pitch circle at the measured point will be equal to or greater than the radial distance from the center to any other point on the pitch circle. The distance X is selected in accordance with the dimensions of the gear which will mesh with gear 50 and the center to center distance between these two gears in their final assembled position such that when a tooth of the meshing gear projects between the two marked teeth of gear 50, zero backlash will be present.

It should be noted that the determination of the center of gear 50 by the foregoing procedure—the axis of rotation of the gear in the mechanism is the center of its central opening—is not the midpoint of the maximum diameter of the gear. In the extreme example referred to above, where the pitch circle of the gear was found to be truly and precisely circular, the determination of the axis of rotation—center of central opening 52—by the foregoing procedure would establish a center or axis of rotation for the central opening 52 offset from the geometrical center of the truly circular pitch circle by an amount equal to X/2. In other words, $2R = D_m + X$ where R is the radius required for zero backlash measured from the pitch circle along the actual maximum diameter of the gear to establish the axis of rotation, and X is the distance by which the maximum diameter $D_m$ falls short of the theoretical required diameter 2R for zero backlash.

The magnitude of X is calculated to be such that zero backlash or some small amount of backlash such as 0.001 or 0.002 inches will exist. In other words, the small amount of backlash provides for some tolerance in the assembled center to center distance C of the meshed gears 50 and 80 when the marked point is in mesh in the assembly). Because the marked point on gear 50 is a high point or maximum radius of the gear as formed, backlash at any other point on the gear cannot be less than that established by locating the axis of rotation of the gear in the manner described above. Thus, there is no possibility of binding between the meshed gears.

The axis of rotation of gear 50 is established by the engagement of its central opening 52 with bushing 56 on the annular neck section of rotary member 52. In order that the zero backlash condition is obtained at the cycle start or cycle end position of the workpiece, it is necessary that gear 50 be rotatively oriented relative to rotary member 42 so that its marked point is in mesh with gear 80 when rotary member 42 is in the cycle start position. Rotary member 42 will be in the cycle start position when shoe 38 of planet crank 36 is in the position shown in the drawing at which the axis of rotation of shoe 38, if extended, would intersect the pitch circles of both planet gear 32 and sun gear 28 at the point of tangency of these two circles. In this position, shoe 38 is at a minimum radial distance from the axis of rotation 48 of rotary member 42. This rotary position of rotary member 42 can be precisely established by operation of the input and planetary gear train.

Figure 4:
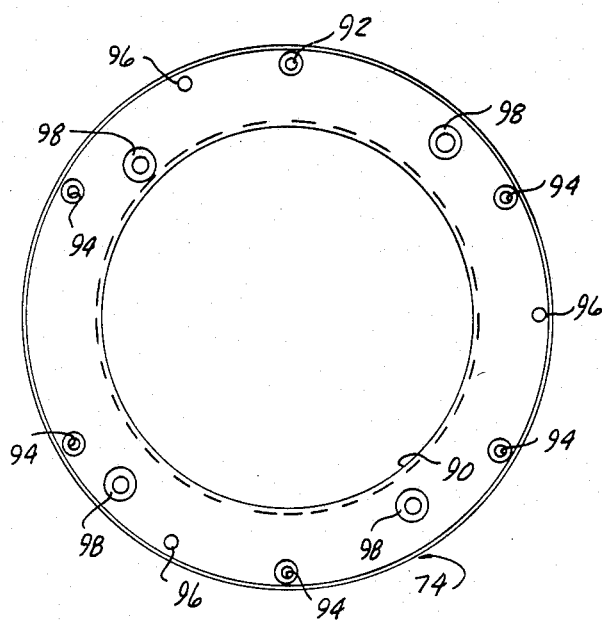
FIG. 4 is a top plan view of an insert employed in combination with the gear of FIG. 2.
Figure 3:
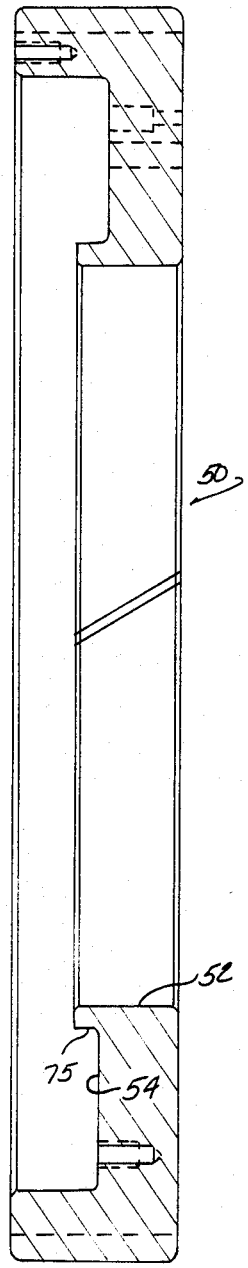
FIG. 3 is a cross-sectional view of the main gear of FIG. 2.

Rotative orientation of gear 50 relative to member 42 is accomplished during the final finishing steps performed on gear 50—namely the drilling and reaming of dowel holes 86 and the tapping and threading of bolt holes 88 (FIG. 2) which respectively receive dowels 78 and bolts 86 which locate and secure detent plate insert 74 in position on gear 50. Prior to the performance of this step, detent insert 74 is positioned upon gear 50 with its central opening 90 snugly received on the outer surface 75 of the neck around the central opening 52 in gear 50. It will be recalled that this latter surface, 75, of gear 50 was finally ground concentric with opening 52. Referring particularly to FIG. 4, one bolt hole 92 is drilled first through insert 74 and marked to serve as a reference point for locating the remaining bolt holes 94, dowel holes 96 and detent recesses 98. It will be noted that the detent recesses 98 are not symmetrically located about the axis of insert 74 but are offset in a pattern matching that of the locations of the various detent ball assemblies 62 carried by detent plate 64. This asymmetrical relationship for the detent holes assures that coupling of detent insert 74 to detent plate 64 by means of the detents can occur at only one rotative orientation of the insert relative to the plate.

Detent insert 74, after being seated upon gear 50 is rotated relative to the gear until the marked bolt hole 92 is aligned with the marked tooth space on gear 50 and is then fixedly clamped to gear 50 to function as a drill jig locating dowel pin bores 86 and tap bores 88 in gear 50. After these latter holes have been formed, dowel pins are seated within the dowel pin holes to rotatively lock insert 74 to gear 50 and bolts 76 are employed to fixedly clamp the two parts to each other. Gear 50 is thus accurately rotatively oriented to detent insert 74 which in turn accurately rotatively orients, by the seating of detents 62, gear 50 to detent plate 64, which in turn is accurately rotatively oriented relative to rotary member 42 and the radial slots 40 employed to couple rotary member 42 to the planetary crank.

While one embodiment of the invention has been described in detail, it will be apparent to those skilled in the art the disclosed embodiment may be modified. Therefore, the foregoing description is to be considered exemplary rather than limiting, and the true scope of the invention is that defined in the following claims.

What is claimed is:

1. A method of assembling a motion generating mechanism for driving an output means in a work cycle wherein said output means is accelerated from a predetermined start position and then decelerated to a finish position, said mechanism including a constant speed rotary input means, motion modifying means including a first gear which may vary from true circularity and have a pitch circle whose diameter at various points may differ from its design pitch circle diameter D, means for mounting said first gear for rotation about a first fixed axis, said motion modifying means being driven by said input means and being operable to transform the constant speed rotation of said input means into a variable speed rotation of said first gear wherein said first gear is accelerated through a first portion of a complete revolutionary cycle from an initial position corresponding to said predetermined start position and decelerated through a final portion of said one complete revolutionary cycle until said first gear returns to said initial position, motion multiplying means including a second gear mounted for rotation about a second fixed axis parallel to said first axis in mesh with said first gear, said second gear having a pitch diameter $D_2$, said first and second fixed axis disposed a distance C from one another, and means drivingly coupling said motion multiplying means to said output means;

said method of assembling comprises locating said first gear relative to said first axis by performing the steps of:

finishing the formation of teeth on said first gear prior to finishing a circular opening on said first gear for engagement with a rotary member centered on said first fixed axis;

measuring said first gear after formation of said teeth to determine a circumferential location of maximum diameter $D_m$ on the pitch circle of the first gear;

marking a first point on the first gear corresponding to the circumferential location of maximum diameter $D_m$;

establishing an axis of rotation for said first gear at a radial distance R measured from said first point on said pitch circle along the maximum diameter, wherein $R = C - (D_2/2)$ and $2R > D_m$;

grinding the circular opening centered on a second point defined at the radial distance R along the maximum diameter measured from the first point; and assembling said first gear with the circular opening engaging said rotary member and with said first point in meshing engagement with said second gear when said mechanism is in said start position such that when said first gear is in said initial position a straight line intersecting said first and said second axes intersects the pitch circle of said first gear at a radial distance R from said first axis which is greater than a second radial distance from said first axis to any other point on said pitch circle of said first gear and wherein said first and second gears meshingly engage at said initial position having backlash in the range from 0 to 0.002 inches inclusive.

2. The method defined in claim 1, further comprising the step of radially locating said first gear relative to said rotary member with means defining an axially extending radially outwardly facing annular surface integrally formed on said rotary member lying at a fixed radial distance from said first axis, said first gear having said circular opening therethrough conformed to circumferentially engage said annular surface of said rotary member, said annular surface and said circular opening concentric to said first axis, said circular opening in said first gear having its center spaced at said radial distance R from the first point on said pitch circle intersected by said straight line equal to $(D_m + X)/2$ where $X = 2R - D_m$ and X is a linear distance such that $(D_m + X)/2$ is greater than said second radial distance from said first fixed axis to any other point on said pitch circle.

3. The method defined in claim 2 further comprising the steps of fixedly mounting an annular plate on said first gear concentric with said center, and rotatively coupling said rotary member with overload release means to said annular plate, said overload release means being non-symetrically spaced about said first axis to accomodate rotative coupling of said member and plate in only one rotative orientation relative to each other.

4. A method of assembling a motion generating mechanism comprising the steps of:

forming finished teeth on a first gear prior to finishing a circular opening on the first gear for engagement with a rotary member centered on a first fixed axis;

measuring the first gear after formation of the teeth to determine a circumferential location of maximum diameter $D_m$ on a pitch circle of the first gear;

marking a first point on the first gear corresponding to the circumferential location of maximum diameter $D_m$;

establishing an axis of rotation for the first gear at a radial distance R measured from the first point on the pitch circle along the maximum diameter, wherein $R = C - (D_2/2)$ and $2R > D_m$, where $D_2$ is a pitch diameter of a second gear mounted for rotation about a second fixed axis parallel to the first axis and in mesh with the first gear and C is a distance from the first fixed axis to the second fixed axis;

grinding a circular opening centered on a second point defined at the radial distance R along the maximum diameter measured from the first point; and assembling the first gear with the circular opening engaging the rotary member and with the first point in meshing engagement with the second gear when in a start position such that when the first gear is in the start position a straight line intersecting the first and second fixed axes intersects the pitch circle of the first gear at a radial distance R from the first axis which is greater than a second radial distance from the first axis to any other point on the pitch circle of the first gear and wherein the first and second gears meshingly engage at the start position having backlash in the range from 0 to 0.002 inches inclusive.

5. The method defined in claim 4, further comprising the step of:

radially locating the first gear relative to the rotary member with means defining an axially extending radially outwardly facing annular surface integrally formed on the rotary member lying at a fixed radial distance from the first axis, the first gear having the circular opening therethrough conformed to circumferentially engage the annular surface of the rotary member, the annular surface and the circular opening concentric to the first axis, the circular opening in the first gear having its center spaced at the radial distance R from the first point on the pitch circle intersected by the straight line equal to $(D_m + X)/2$ where $X = 2R - D_m$ and X is a linear distance such that $(D_m + X)/2$ is greater than the second radial distance from the first fixed axis to any other point on the pitch circle.

6. The method defined in claim 5 further comprising the step of:
   fixedly mounting an annular plate on the first gear concentric with the first axis; and
   rotatively coupling the rotary member with overload release means to the annular plate, the overload release means being non-symmetrically spaced about the first axis to accommodate rotative coupling of the member and plate in only one rotative orientation relative to each other.

* * * * *